Sept. 1, 1964     D. E. ANDERSON     3,146,900
NUCLEAR REACTOR SERVICING MACHINES
Filed Aug. 28, 1961     3 Sheets-Sheet 1
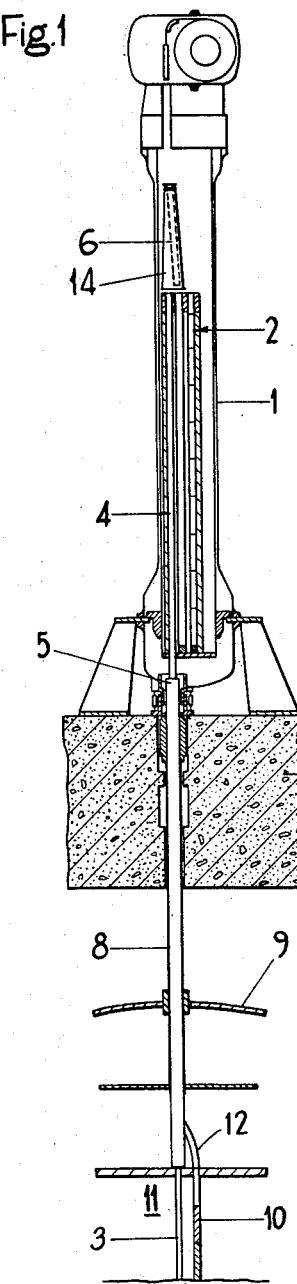
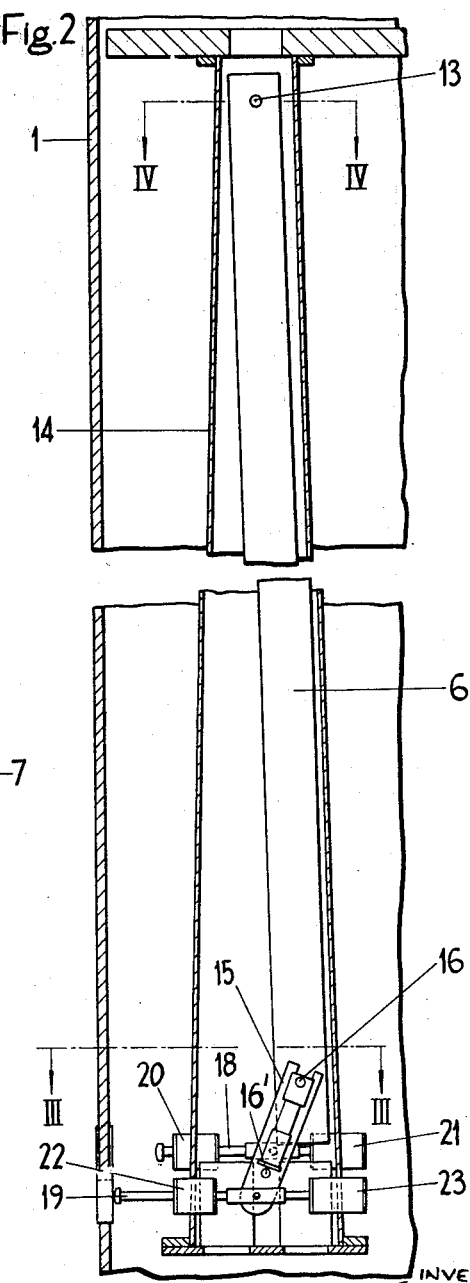

3,146,900
NUCLEAR REACTOR SERVICING MACHINES
Douglas Edward Anderson, Canterbury, Kent, England, assignor to The General Electric Company Limited, London, England
Filed Aug. 28, 1961, Ser. No. 134,365
Claims priority, application, Great Britain, Sept. 1, 1960, 30,172/60
4 Claims. (Cl. 214—18)

This invention relates to nuclear reactor servicing machines, and is concerned more particularly with charge/discharge machines for gas-cooled nuclear reactors.

According to the present invention, a nuclear reactor servicing machine comprises a pressure vessel housing a magazine for the stowage of fuel elements, a charge tube whereby fuel elements can be transferred from the reactor to the servicing machine and vice versa, a transfer tube having two operating positions for transferring fuel elements between the magazine and the charge tube, a toggle mechanism for effecting movement of the transfer tube between its respective operating positions; push rods for operating the toggle mechanism, and externally operated tappets extending through the wall of the pressure vessel and cooperating with the push rods.

The arrangement provides a very simple drive means for operating the transfer tube of the servicing machine. Furthermore, any small misalignment between the ends of the push rods and the tappets will not affect the operation.

In order that the invention may be clearly understood, one construction of servicing machine, suitable for use with a gas-cooled nuclear reactor, will now be described by way of example, with reference to the accompanying drawings, in which:

FIGURE 1 is a schematic showing of the machine operatively connected to a reactor for the charge and discharge of fuel elements;

FIGURE 2 is a part-sectional elevation of a detail of the lower end of the transfer tube shown in FIGURE 1;

Figure 3:
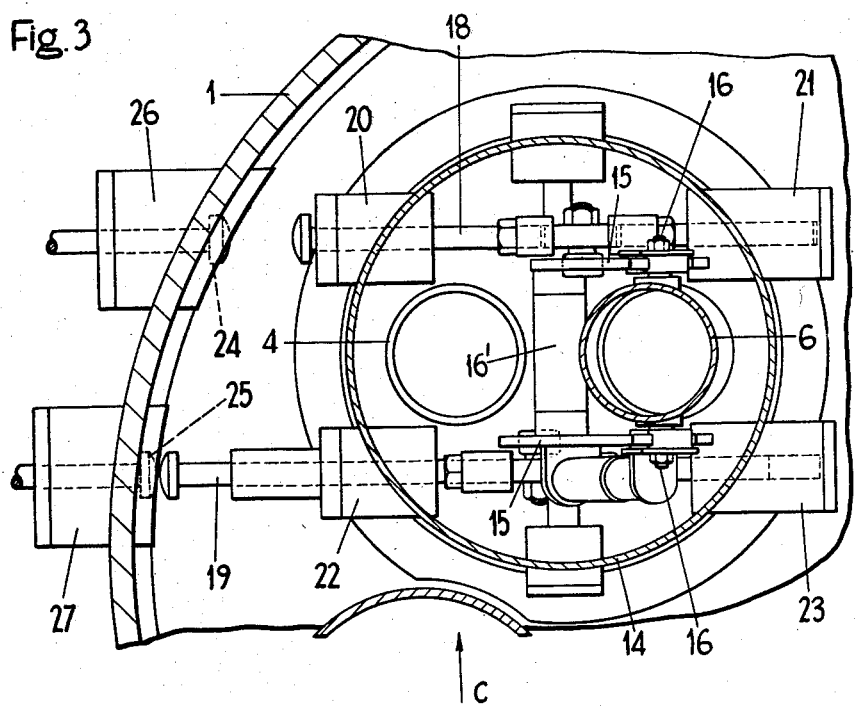
FIGURE 3 is a section on line III—III in FIGURE 2.
Figure 4:
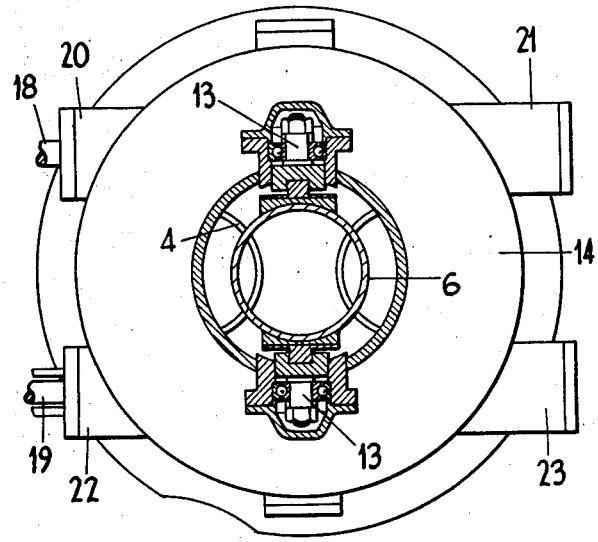
FIGURE 4 is a section on line IV—IV in FIGURE 2.
Figure 5:
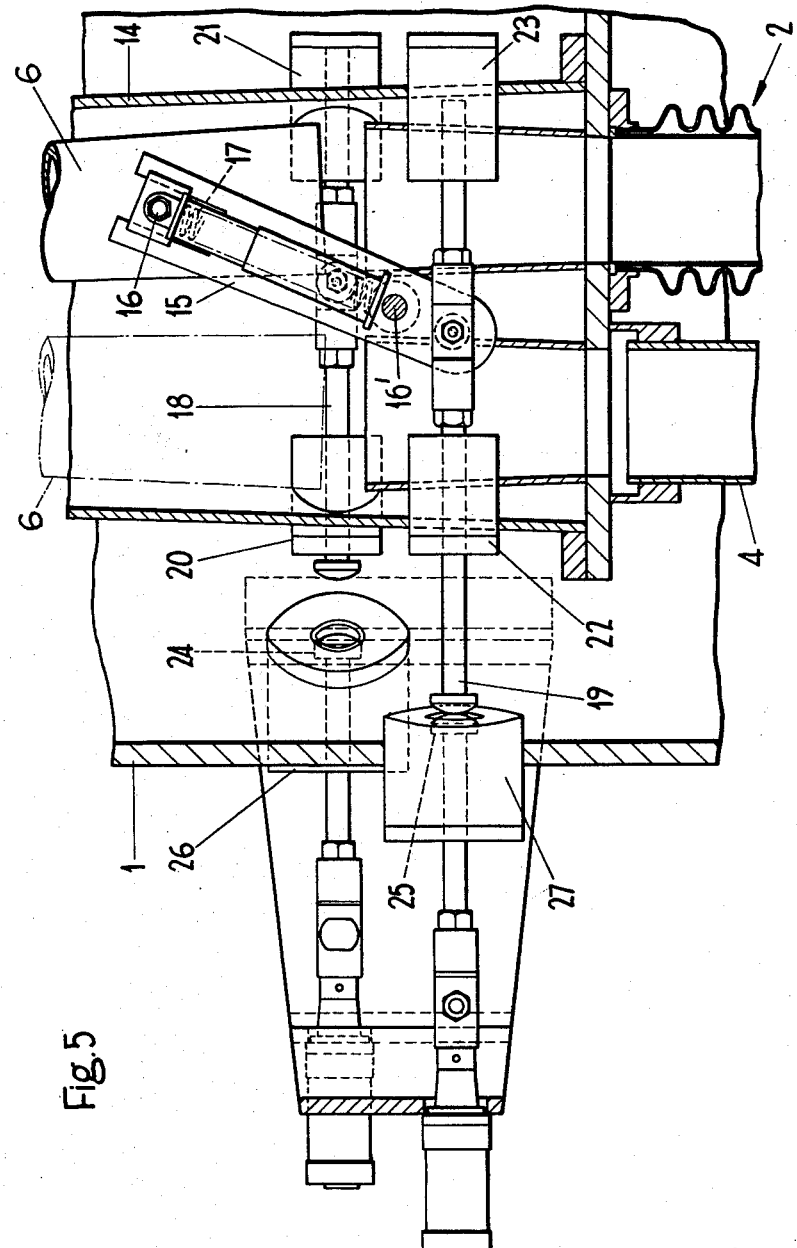
FIGURE 5 is a part-sectional elevation looking in the direction of the arrow C in FIGURE 3, the figure illustrating the disposition of the transfer tube of the machine and operating mechanism therefor.

Referring to the drawings, and particularly to FIGURE 1, the servicing machine comprises essentially a pressure vessel 1, a magazine 2 for the stowage of fuel elements, a magazine fixed tube 4 communicating with a charge tube 5, and a transfer tube 6 having two operating positions for transferring fuel elements between the magazine 2 and the fixed tube 4. The machine also houses hoist means and operating means (not shown) for handling the fuel elements and driving the moving parts of the machine. The charge tube 5, when the machine is operating, extends downwards through an aperture in the biological shield 7 of the reactor through a standpipe 8 fixed to the reactor pressure vessel 9 and communicates with a fuel element channel 10 in the reactor core 11. The lower end of the charge tube 5 houses a radiused tube member 12 which can be connected in turn to a number of fuel element channels symmetrically arranged around a control rod channel 3. In order to discharge the fuel elements from a channel in the reactor, the elements are lifted by hoist means through the charge tube 5 into the fixed magazine tube 4, and thence into the transfer tube 6; the transfer tube is then moved to its second operating position; where it is aligned with a magazine tube, and the elements are lowered into the magazine.

The transfer tube 6 is pivoted at its upper end at 13, so that it can swing between the two operating positions. The tube is housed within a housing 14 within the pressure vessel 1. Movement of the transfer tube 6 into the required operating position is effected by a toggle mechanism having a toggle link 15 pivoted at its upper end to the transfer tube by pins 16 and also pivoted between its ends about a horizontal pivot pin 16'. The link is biassed by a spring 17 so that it moves about a dead center position to bias the transfer tube into the required position.

The link 15 is connected to push rods 18 and 19, which are positioned respectively above and below the pin 16'; these push rods slide in bearing bushes 20–23 in the transfer tube housing 14 and forward movement of one or other of said push rods actuates the toggle link 15 to move it, and hence the transfer tube 6, to one or other of the two operating positions. Tappets 24 and 25, extending through bearing bushes 26 and 27 in the pressure vessel 1, cooperate with the push rods 18 and 19, and these tappets are arranged to be operated by means external to the pressure vessel. This arrangement avoids the necessity for complicated drive mechanisms for moving the transfer tube, and being externally operated it is readily accessible should a failure occur in the machine.

I claim:

1. A servicing machine for a nuclear reactor, said machine having a pressure vessel housing a magazine for the stowage of fuel elements, a charge tube for transferring the fuel elements between the servicing machine and the reactor, a transfer tube having two operating positions for transferring the fuel elements between the magazine and the charge tube, a toggle mechanism connected to the transfer tube for effecting movement of the transfer tube between said operating positions, push rods cooperating with the toggle mechanism for operating said toggle mechanism, and externally operated tappets extending through the wall of the pressure vessel and cooperating with the push rods.

2. A servicing machine for a nuclear reactor, said machine having a pressure vessel housing a magazine for the stowage of fuel elements, a charge tube for transferring the fuel elements between the servicing machine and the reactor, a transfer tube having an upper and a lower end, said transfer tube being pivoted at its upper end and adapted to swing between two operating positions for transferring the fuel elements between the magazine and the charge tube, a toggle mechanism connected to the transfer tube for effecting movement of the transfer tube between said operating positions, push rods cooperating with the toggle mechanism for operating said toggle mechanism, and externally operated tappets extending through the wall of the pressure vessel and cooperating with the push rods.

3. A servicing machine for a nuclear reactor, said machine having a pressure vessel housing a magazine for the stowage of fuel elements, a charge tube for transferring the fuel elements between the servicing machine and the reactor, a transfer tube having an upper and a lower end, said transfer tube being pivoted at its upper end and adapted to swing between two operating positions for transferring the fuel elements between the magazine and the charge tube, a toggle mechanism having a toggle link pivoted to said lower end of the transfer tube, said link being spring-biassed to urge the transfer tube into either one of its said operating positions, push rods cooperating with the toggle link for operating said toggle mechanism, and externally operated tappets extending through the wall of the pressure vessel and cooperating with the push rods.

4. A servicing machine for a nuclear reactor, said machine having a pressure vessel housing a magazine for the stowage of fuel elements, a charge tube for transferring the fuel elements between the servicing machine and the reactor, a transfer tube having an upper and a lower end, said transfer tube being pivoted at its upper end and adapted to swing between two operating positions for transferring the fuel elements between the magazine and the charge tube, a toggle mechanism having a toggle link pivoted between its ends about a horizontal axis to said lower end of the transfer tube, said link being spring-biassed to urge the transfer tube into either one of its said operating positions, a pair of push rods positioned respectively above and below said pivot of the toggle link and cooperating with said link for operating the toggle mechanism, and a pair of externally operated tappets, one for each push rod, extending through the wall of the pressure vessel and cooperating with said push rods, forward movement of a push rod pivoting said toggle link to swing the transfer tube from one of its operating positions to the other.

References Cited in the file of this patent

UNITED STATES PATENTS 2,725,993 Smith _____ Dec. 6, 1955

FOREIGN PATENTS 217,959 Australia _____ Oct. 17, 1958
1,055,703 Germany _____ Apr. 23, 1959